(No Model.)
N. F. MATHEWSON.
HAY FORK.
No. 402,093. Patented Apr. 23, 1889.
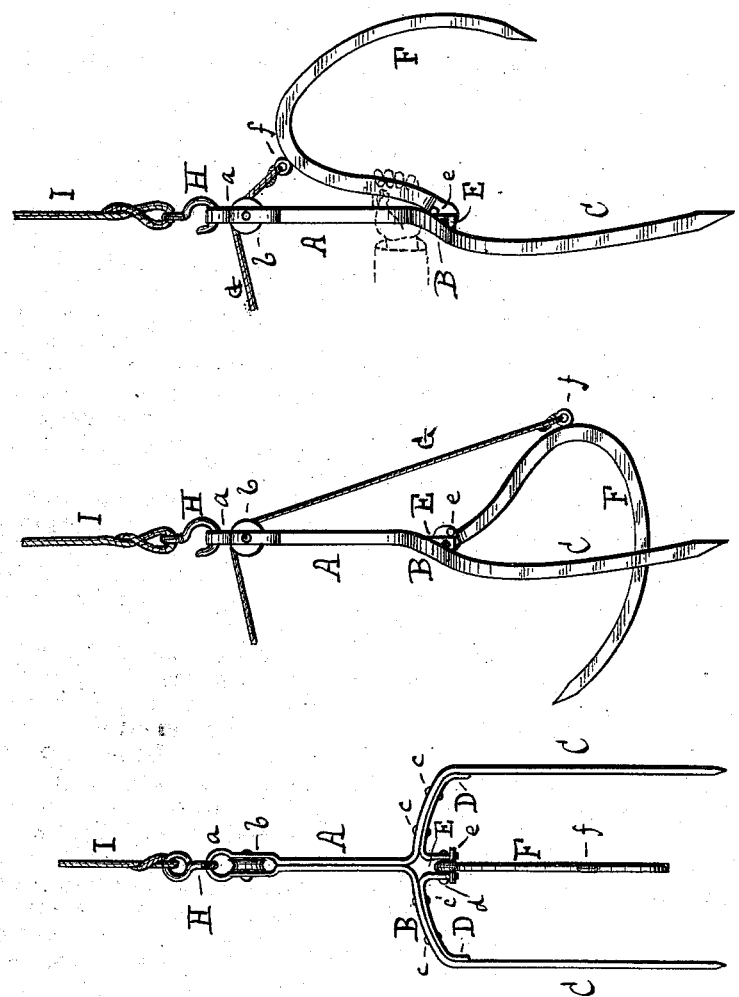
WITNESSES.
INVENTOR.
Nathan F. Mathewson

UNITED STATES PATENT OFFICE.

NATHAN F. MATHEWSON, OF PROVIDENCE, RHODE ISLAND.

HAY-FORK.

SPECIFICATION forming part of Letters Patent No. 402,093, dated April 23, 1889.

Application filed January 2, 1889. Serial No. 295,221. (No model.)

*To all whom it may concern:*

Be it known that I, NATHAN F. MATHEWSON, of the city and county of Providence, in the State of Rhode Island, have invented a certain new and useful Improvement in Hay-Forks; and I declare the following to be a specification thereof, reference being had to the accompanying drawings.

Like letters indicate like parts.

Figure 1 is a rear elevation of my invention. Figs. 2 and 3 are side elevations of the same, respectively showing my improved hay-fork closed and open.

My invention relates to that class of hay-forks by which a large quantity of hay can be raised by tackle for stowage in mows or lofts or for other purposes; and it consists of a handle having a ring and sheave, in combination with two fixed tines and a central swinging tine bent into hook form and pivoted to a hanger, as hereinafter specified.

In the drawings, the handle is shown at A. It terminates in a loop or eye $a$, within which is mounted a pulley-wheel or sheave, $b$.

B represents the top of the fork, and C the two fixed tines projecting downward at the sides and parallel to each other. Stiffening-pieces D are fastened to the top bar, B, by rivets $c$, and are bent to form hangers E in line with the handle A. A hook-shaped tine, F, is mounted within the hangers E by the bolt $d$. Stop-pins $e$ are formed on the head of the hooked tine F. A ring or eye, $f$, is made upon the outer curve of the hooked tine F, as shown. A rope, G, fastened to the ring $f$, passes over the pulley $b$. The hay-fork is suspended by the hook H and rope I of the hoisting-tackle in the usual manner.

In using my improved hay-fork I raise the swinging tine F into the position shown in Fig. 3, seizing it and the handle A by one hand, as indicated by dotted lines. I then thrust the tines C down into the mass of mown or dried hay to about the depth of said tines. I then let the swinging tine F fall, and by its weight it automatically enters into said mass of hay and is crowded into the mass by the pressure of the foot until it comes into the position shown in Fig. 2. The stop-pins $e$ are useful to limit the upward and downward swing or travel of the bent tine F.

It will be seen that the tines C F are inclined toward each other, and when closed, as seen in Fig. 2, seize upon a large mass of hay, which is then hoisted in the usual manner to the mow or loft by the tackle. When the hay has been so raised and swung to the desired place, I pull on the rope G, which withdraws the bent tine F from the hay and brings said tine into the position shown in Fig. 3. The hay, being no longer held by said tine, drops easily from the fork.

It is obvious that the top B may be made long enough to give a wider spread to the tines C than is shown, so that more than one swinging tine can be mounted between them, if desired; but such a modification would be within my invention.

Instead of using a sheave, $b$, I may form an eye in the shank for the passage of the rope G.

In the drawings my improved hay-fork is shown as made of wrought-iron; but the handle and cross-bar may be made of cast metal as well, in which case the hangers would be cast integral therewith and the side tines, C, could be inserted or secured in any suitable manner.

I claim as a novel and useful invention and desire to secure by Letters Patent—

1. The combination of the handle A, having an eye, $a$, the top piece, B, the stiffening-pieces D, having the hangers E, the fixed tines C, the pivotally-mounted hooked tine F, and the rope G, fastened to the tine F and passing through the eye $a$, substantially as specified.

2. The improved hay-fork herein described, consisting of the handle A, having the eye $a$ and sheave $b$, the top piece, B, the fixed tines C, the stiffening-pieces D, having the hangers E, the pivotally-mounted hooked tine F, having the stop-pins $e$ and the eye $f$, and the rope G, substantially as specified.

NATHAN F. MATHEWSON.

Witnesses:
 DANIEL W. FINK,
 WARREN R. PERCE.